(12) United States Patent
Cook et al.

(10) Patent No.: US 7,889,413 B1
(45) Date of Patent: Feb. 15, 2011

(54) FIELD GENERATING NANOPARTICLES DOPED IN LIGHT VALVES

(75) Inventors: Gary Cook, Beavercreek, OH (US);
Dean R. Evans, Beavercreek, OH (US)

(73) Assignee: The Unites States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 12/483,934

(22) Filed: Jun. 12, 2009

Related U.S. Application Data

(63) Continuation-in-part of application No. 12/214,294, filed on Jun. 12, 2008.

(60) Provisional application No. 61/132,342, filed on Jun. 12, 2008.

(51) Int. Cl.
*G02F 1/07* (2006.01)

(52) U.S. Cl. .................... 359/245; 359/256

(58) Field of Classification Search ............ 359/237, 359/245, 290, 319, 256
See application file for complete search history.

(56) References Cited

U.S. PATENT DOCUMENTS 5,003,528 A * 3/1991 Motes et al. ........... 369/110.01

6,943,924 B2 * 9/2005 Marquet et al. ............... 359/9
7,289,260 B2 * 10/2007 Kaufman et al. ........... 359/319

OTHER PUBLICATIONS

J.L. Carns et al., "Self-Activated Liquid-Crystal Cells with Photovoltaic Substrates", Optics Letters, Apr. 1, 2006, pp. 993-995, vol. 31, No. 7, Optical Society of America.

J.L. Carns et al., "Photovoltaic Field-Induced Self-Phase Modulation of Light in Liquid Crystal Cells", Mol. Cryst. Liq. Cryst. 2006, pp. 83-92, vol. 453, Taylor & Francis Group, LLC, April.

* cited by examiner

*Primary Examiner*—Mohammed Hasan
(74) *Attorney, Agent, or Firm*—AFMCLO/JAZ; James Calve

(57) ABSTRACT

The present invention provides a method for automatically activating an optical light valve. The method includes providing a photorefractive cell having a birefringent medium which is doped with nanoparticles and transmitting light through the photorefractive cell to create an electric field in the photorefractive cell such that the alignment state of the birefringent medium and nanoparticles is changed to thereby reduce the intensity of the light being transmitted therethrough, wherein the intensity of light is reduces without an external power source.

19 Claims, 4 Drawing Sheets

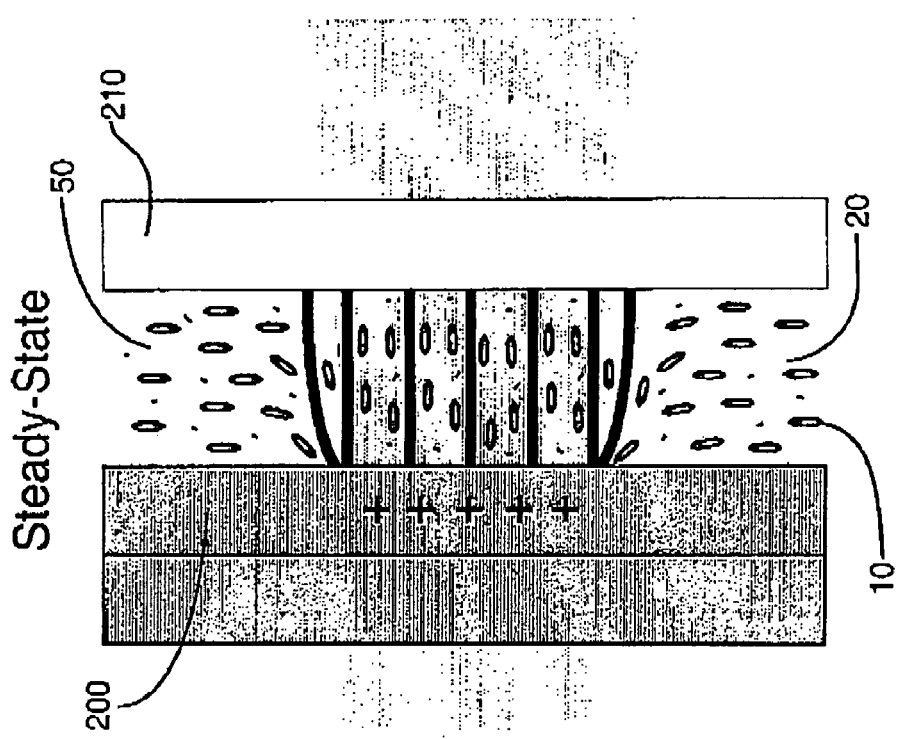
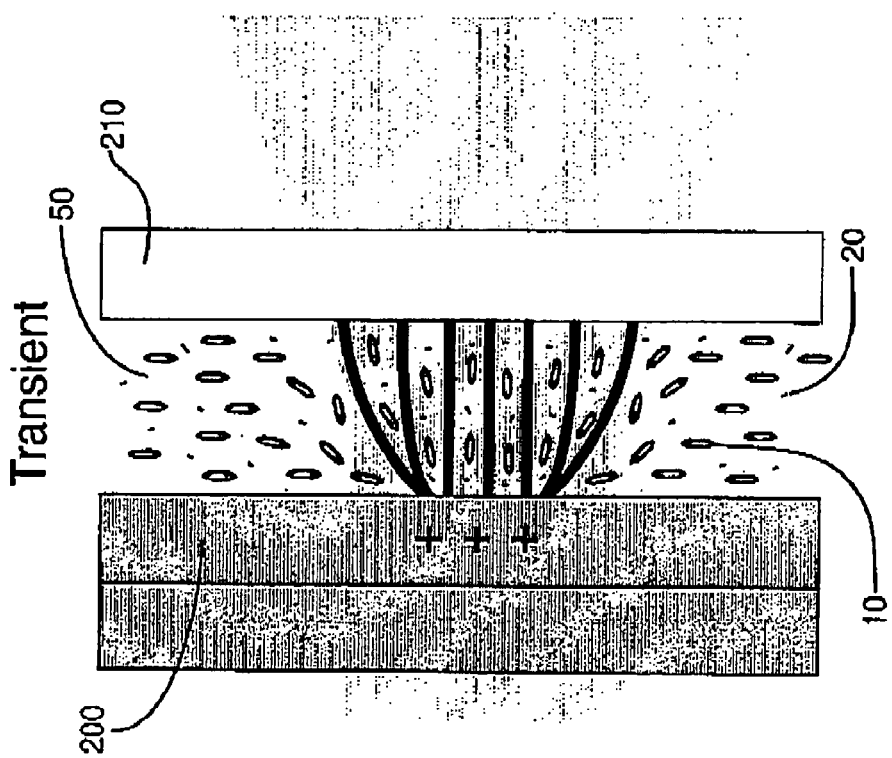

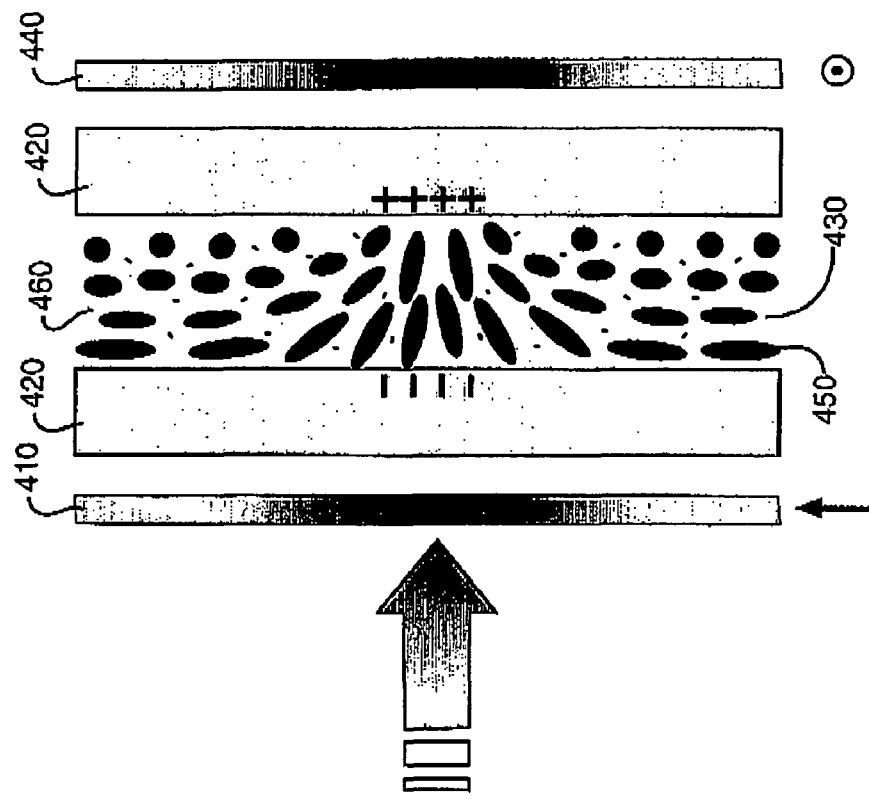
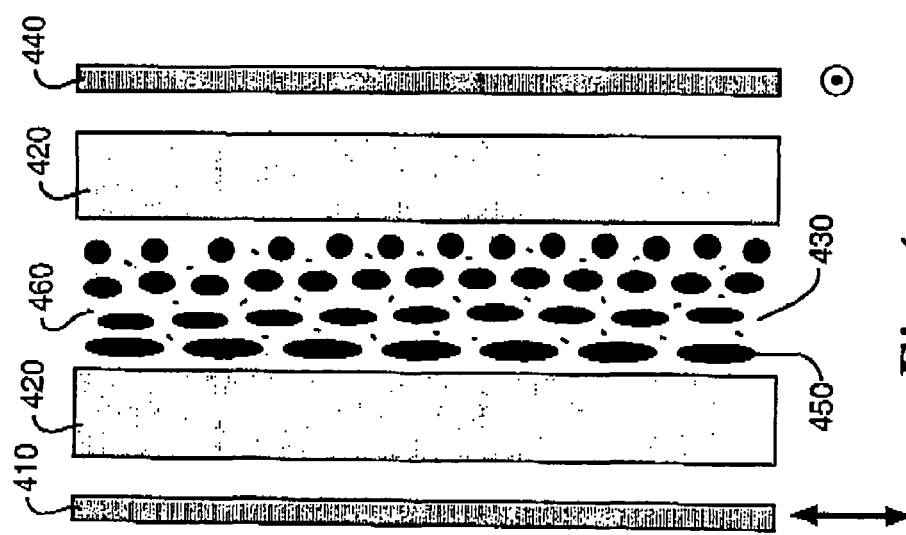
Fig. 4b
Fig. 4a

FIELD GENERATING NANOPARTICLES DOPED IN LIGHT VALVES

CROSS-REFERENCE TO RELATED APPLICATION

The present application relates to and claims priority to U.S. Provisional Patent Application No. 61/132,342 filed Jun. 12, 2008. The present application is a continuation-in-part of U.S. patent application Ser. No. 12/214,294 entitled "Nanoparticle Doped Hybrid Photorefractives" filed on Jun. 12, 2008. The contents of U.S. Provisional Patent Application No. 61/132,342 and U.S. patent application Ser. No. 12/213,294 are hereby incorporated by reference.

RIGHTS OF THE GOVERNMENT

The invention described herein may be manufactured and used by or for the Government of the United States for all governmental purposes without the payment of any royalty.

FIELD OF THE INVENTION

The present invention relates to an automatically activating optical light valve which requires no external power source. The electric (or magnetic) field necessary for the operation of the device is created locally by the incident light.

BACKGROUND OF THE INVENTION

Optical light valves are useful for controlling the intensity of transmitted light. They may find uses as optical attenuators, optical limiters, welding visors, optical shutters, etc. Optical light valves may be fabricated using a number of possible technologies, but the most successful, and lows cost, have been based on liquid crystals.

SUMMARY OF THE INVENTION

The present invention provides significant advantages over conventional liquid crystal light valves. The invention eliminates the need for any external power source and allows the optical switching to occur locally, rather than across the whole device aperture. Local operation permits ambient scene information to be transmitted without disruption, distortion, or coloration, while blocking dangerous light intensities. This method may also allow for polymers to remain poled without or with lower external fields.

In accordance with one aspect of the invention, there is provided a method for automatically activating an optical light valve. The method includes providing a photorefractive cell having a birefringent medium which is doped with nanoparticles and transmitting light through the photorefractive cell to create an electric field in the photorefractive cell such that the alignment state of the birefringent medium and nanoparticles is changed to thereby reduce the intensity of the light being transmitted therethrough, wherein the intensity of light is reduces without an external power source.

In accordance with another aspect of the invention, there is provided a method for automatically activating an optical light valve. The method includes providing a photorefractive cell having a birefringent medium which is doped with nanoparticles, positioning the photorefractive cell between first and second crossed polarizers, and transmitting light through the photorefractive cell to create an electric field in the photorefractive cell such that the alignment state of the birefringent medium and nanoparticles is changed thereby negating the polarization rotation property and causing the light to be blocked by the second polarizer, wherein the intensity of light is reduces without an external power source.

The birefringent medium may include one or a combination of liquid crystal, dispersed liquid crystal, stabilized liquid crystal, polymer, monomer, oligimer, photovoltaic gel, and inorganic photorefractive media. The nanoparticles may be photovoltaics, ferromagnetic, multiferroic, thermophotovoltaic, and pyroelectric. The nanoparticles may include one or a combination of inorganic crystal, inorganic glass, polymer, lithium niobate, lithium tantalite, and ruby. The nanoparticles may be passive nanoparticles coated with photovoltaic material. The size of the nanoparticles may range from sub-nanometer to 100 microns.

The birefringent medium and nanoparticles may have a concentration in the range of $1\ cm^{-3}$ to $1\ nm^{-1}$. The birefringent medium may include a dye and/or metal chelates.

BRIEF DESCRIPTION OF THE DRAWINGS

FIG. 2a shows a liquid crystal cell between photovoltaic substrates and an ITO coated glass substrate in a transient state.

FIG. 2b shows a liquid crystal cell between photovoltaic substrates and an ITO coated glass substrate in a steady-state.

FIG. 4a shows a liquid crystal cell between photovoltaic substrates and polarizers.

FIG. 4b shows the liquid crystal cell of FIG. 4a under illumination.

DETAILED DESCRIPTION OF THE INVENTION

Figure 1A:
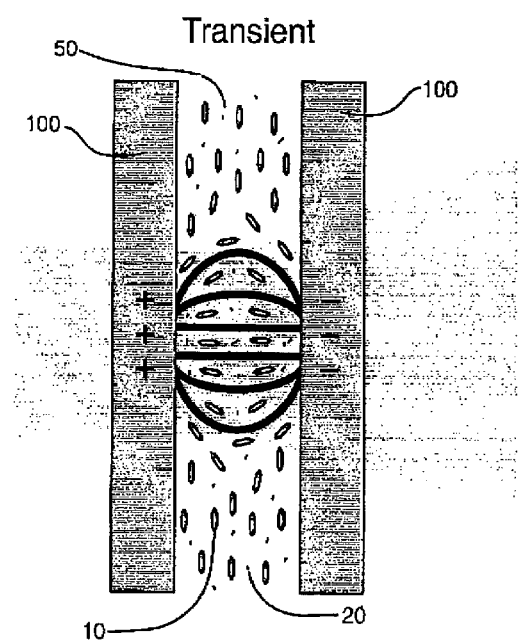
FIG. 1a shows a liquid crystal cell between photovoltaic substrates in a transient state.
Figure 1B:
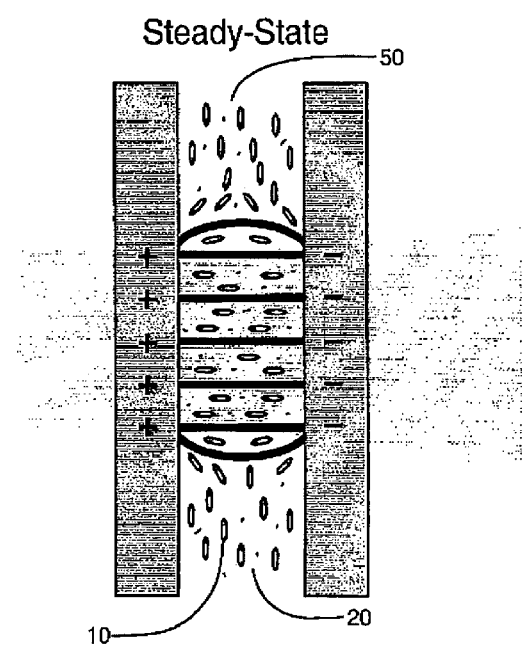
FIG. 1b shows a liquid crystal cell between photovoltaic substrates in a steady-state.
Figure 3B:
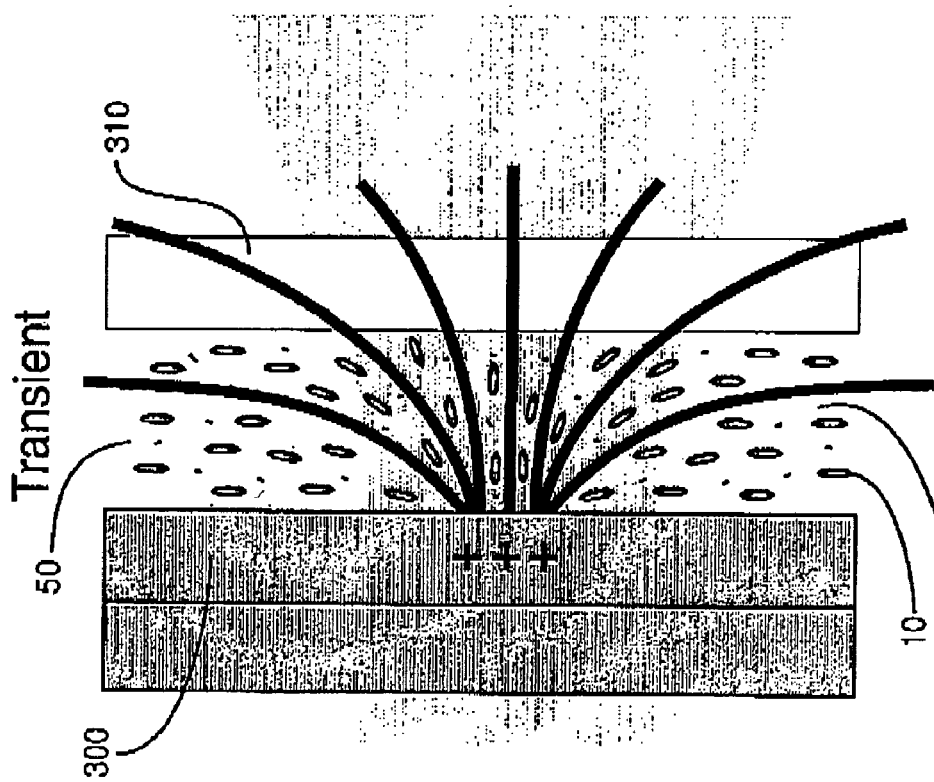
FIG. 3b shows a liquid crystal cell between photovoltaic substrates and an insulating substrate in a steady-state.
Figure 3A:
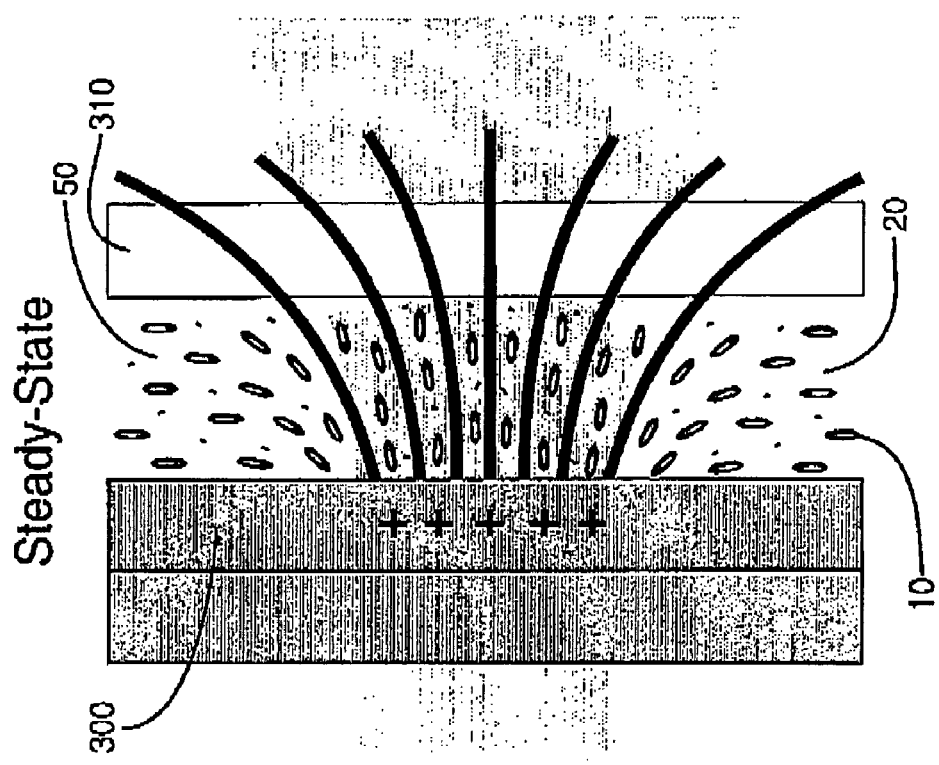
FIG. 3a shows a liquid crystal cell between photovoltaic substrates and an insulating substrate in a transient state.

The present invention provides an automatically activating optical light valve which requires no external power source. The electric field necessary for the operation of the device is created locally (within the substrate window and/or within the birefringent medium) by the incident light. The device includes a liquid crystal (or polymer) cell 50 in which one or both optical windows are photovoltaic and where the liquid crystal (birefringent) medium 10 is doped with photovoltaic nanoparticles 20. The presence of the photovoltaic (other mechanisms to photo of thermally generate electric fields) nanoparticles 20 helps to increase the sensitivity of the device and reduces the need to have photovoltaic windows.

In one embodiment, the device is used without polarizers. In this form the device acts as an intensity dependent nonlinear lens, causing the transmitted light to be strongly dispersed. The intensity of the transmitted light is therefore dramatically reduced. On exposure to light, the initial local alignment state of the liquid crystals is changed by the development of a strong electric field in either the photovoltaic substrates and/or in the photovoltaic nanoparticles. The magnitude and response time of the local photovoltaic field depends on the intensity of the incident light. If the light is non-uniform, the intensity gradients give rise to strong gradients in the resulting electric field. The induced re-alignment of the liquid crystal molecules 10 therefore initially mimics the intensity profile of the light. Since the refractive index of liquid crystals 10 depends strongly on the molecular orientation, radial variations in the exposure intensity result in a strong lens-like distortion of the transmitted light pattern.

This effect may be either transient or permanent (during the exposure time), depending on the specific construction of the device. When the cell comprises either two photovoltaic substrates 100, 100, or a single photovoltaic substrate 200 with a conducting second substrate 210 (e.g. an indium tin oxide (ITO) coated glass window), the lens effect is transient. With prolonged exposure the transmitted beam is initially strongly dispersed by the device, but gradually relaxes back to its original form. This occurs because the electric field gradually builds up in the lower intensity regions, reducing the electric field gradient across the illuminated area. However, where a single photovoltaic substrate 300 is used in conjunction with an insulating second window 310 (e.g. plain glass or polymer), the lens effect persists during the exposure, providing the illumination area is small. This occurs because in the absence of a complimentary photovoltaic substrate or conducting surface, the electric field from a single substrate 300 remains highly divergent at the substrate surface, preserving a strong radial variation of the local electric field regardless of the illumination intensity profile.

In another embodiment shown in FIGS. 4a and 4b, the device is placed between crossed polarizers 410, 440 and in the quiescent state the liquid crystal layer 430, including the liquid crystals 450 doped with nanoparticles 460, is arranged to rotate the polarization of light by 90 degrees. In this form, the device behaves as a self-activating optical filter. At low light levels shown in FIG. 4a, the device is transparent. However, light of sufficient intensity generates a photovoltaic field via the photovoltaic substrates 420, 420, which locally changes the alignment state of liquid crystals 450 of the liquid crystal layer 430, negating the polarization rotation property and causing the light to be blocked by the second polarizer 440. Additionally, the residual transmitted light intensity may be further reduced by the induced lens action described in the first embodiment.

Both embodiments use pure liquid crystal, or doped liquid crystal (e.g. dyes in addition to the nanoparticles) which may improve the sensitivity of the device. Additionally, the device may be used with photorefractive polymers, gels or inorganic photorefractive media in place of the liquid crystal. The photovoltaic substrates may include inorganic crystals or glasses, polymers, or passive windows coated with a photovoltaic layer. The photovoltaic nanoparticles may comprise inorganic crystals, inorganic glasses, polymers, or passive nanoparticles coated with photovoltaic material. In preferred embodiments, the photovoltaic nanoparticles may be lithium niobate (doped or undoped; oxidized, as-grown, or reduced; stoichiometric, congruent or other composition), lithium tantalate (doped or undoped; oxidized, as-grown, or reduced; stoichiometric, congruent or other composition), or ruby (chromium doped aluminum oxide, as-grown or VTE treated).

While various descriptions of the present invention are described above, it should be understood that the various features can be used singly or in any combination thereof. Therefore, this invention is not to be limited to only the specifically preferred embodiments depicted herein. Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

What is claimed is:

1. A method for automatically activating an optical light valve, the method comprising:
   providing a photorefractive cell having a birefringent medium which is doped with nanoparticles;
   transmitting light through the photorefractive cell to create an electric field in the photorefractive cell such that the alignment state of the birefringent medium and nanoparticles is changed to thereby reduce the intensity of the light being transmitted therethrough,
   wherein the intensity of light is reduced by dispersing the light without an external power source.

2. The method of claim 1 wherein the intensity of the light is reduced without the use of polarizers.

3. The method of claim 1 wherein the birefringent medium includes at least one material selected from the group: liquid crystal, dispersed liquid crystal, stabilized liquid crystal, polymer, monomer, oligimer, photovoltaic gel, and inorganic photorefractive media.

4. The method of claim 1 wherein the nanoparticles include at least one characteristic selected from the group: photovoltaics, ferromagnetic, multiferroic, thermophotovoltaic, and pyroelectric.

5. The method of claim 1 wherein the nanoparticles includes at least one material selected from the group: inorganic crystal, inorganic glass, polymer, lithium niobate, lithium tantalite, and ruby.

6. The method of claim 1 wherein the nanoparticles are passive nanoparticles coated with photovoltaic material.

7. The method of claim 1 wherein the nanoparticles have a size in the range of sub-nanometer to 100 microns.

8. The method of claim 1 wherein the birefringent medium and nanoparticles have a concentration in the range of 1 $cm^{-3}$ to 1 $nm^{-1}$.

9. The method of claim 1 wherein the birefringent medium includes a dye.

10. The method of claim 1 wherein the birefringent medium includes a metal chelate.

11. A method for automatically activating an optical light valve, the method comprising:
    providing a photorefractive cell having a birefringent medium which is doped with nanoparticles;
    positioning the photorefractive cell between first and second crossed polarizers;
    transmitting light through the photorefractive cell to create an electric field in the photorefractive cell such that the alignment state of the birefringent medium and nanoparticles is changed thereby negating the polarization rotation property and causing the light to be blocked by the second polarizer,
    wherein the intensity of light is reduced without an external power source.

12. The method of claim 11 wherein the birefringent medium includes at least one material selected from the group: liquid crystal, dispersed liquid crystal, stabilized liquid crystal, polymer, monomer, oligimer, photovoltaic gel, and inorganic photorefractive media.

13. The method of claim 11 wherein the nanoparticles include at least one characteristic selected from the group: photovoltaics, ferromagnetic, multiferroic, thermophotovoltaic, and pyroelectric.

14. The method of claim 11 wherein the nanoparticles includes at least one material selected from the group: inorganic crystal, inorganic glass, polymer, lithium niobate, lithium tantalite, and ruby.

15. The method of claim 11 wherein the nanoparticles are passive nanoparticles coated with photovoltaic material.

16. The method of claim 11 wherein the nanoparticles have a size in the range of sub-nanometer to 100 microns.

17. The method of claim 11 wherein the birefringent medium and nanoparticles have a concentration in the range of 1 $cm^{-3}$ to 1 $nm^{-1}$.

18. The method of claim 11 wherein the birefringent medium includes a dye.

19. The method of claim 11 wherein the birefringent medium includes a metal chelate.

\* \* \* \* \*